United States Patent [19]

Morita

[11] Patent Number: 5,220,324
[45] Date of Patent: Jun. 15, 1993

[54] WIRELESS COORDINATE READER AND SWITCH STATE DETECTION SYSTEM FOR COORDINATE INDICATOR

[75] Inventor: Yoshiyuki Morita, Tokyo, Japan

[73] Assignee: Seiko Instruments, Inc., Tokyo, Japan

[21] Appl. No.: 714,202

[22] Filed: Jun. 12, 1991

[51] Int. Cl.$^5$ .................. G06K 11/00; G08C 21/00
[52] U.S. Cl. ........................................ 341/32; 341/5; 178/18
[58] Field of Search ................ 341/32, 5; 340/870.31; 367/907; 178/18, 19; 74/471; 395/775

[56] References Cited

U.S. PATENT DOCUMENTS

| | | | |
|---|---|---|---|
| 4,477,877 | 10/1984 | Nakamura et al. | 341/5 |
| 4,806,918 | 2/1989 | Berke et al. | 178/18 |
| 5,025,410 | 6/1991 | Morita | 395/775 |

FOREIGN PATENT DOCUMENTS

| | | |
|---|---|---|
| 254297 | 1/1988 | European Pat. Off. |
| 259841 | 3/1988 | European Pat. Off. |
| 307667 | 3/1989 | European Pat. Off. |

Primary Examiner—Donald J. Yusko
Assistant Examiner—Michael Krakovsky
Attorney, Agent, or Firm—Spensley Horn Jubas & Lubitz

[57] ABSTRACT

A wireless coordinate reader composed of: a sense line plate having a plurality of excitation lines and a plurality of sense lines arranged thereon; a coordinate indicator including a resonant circuit having a resonance frequency in proximity to the frequency of an excitation signal and composed of a coil and a first capacitor, and a switch circuit connected in parallel with the resonant circuit and composed of at least one series circuit of a switch and a resistor, and a second capacitor connected in series with one end of the series circuit; an amplification detection circuit for detecting the magnitude of an induction signal which is induced on a selected sense line when the excitation signal is applied to a selected excitation line and the coordinate indicator is placed above the sense line plate in the vicinity of the selected lines and for outputting an amplitude signal representative of the magnitude of the induction signal; a phase detection circuit for receiving a signal corresponding in phase to the excitation signal and the induction signal induced on the selected sense line for outputting a phase signal representing the relative phase of the induction signal; and a controller for receiving the amplitude signal and signals, correcting height data extracted from the amplitude signal by coordinate data calculated on the basis of the amplitude signal, correcting the phase signal on the basis of the corrected height data, and determining the state of the switch from the corrected phase signal.

3 Claims, 9 Drawing Sheets

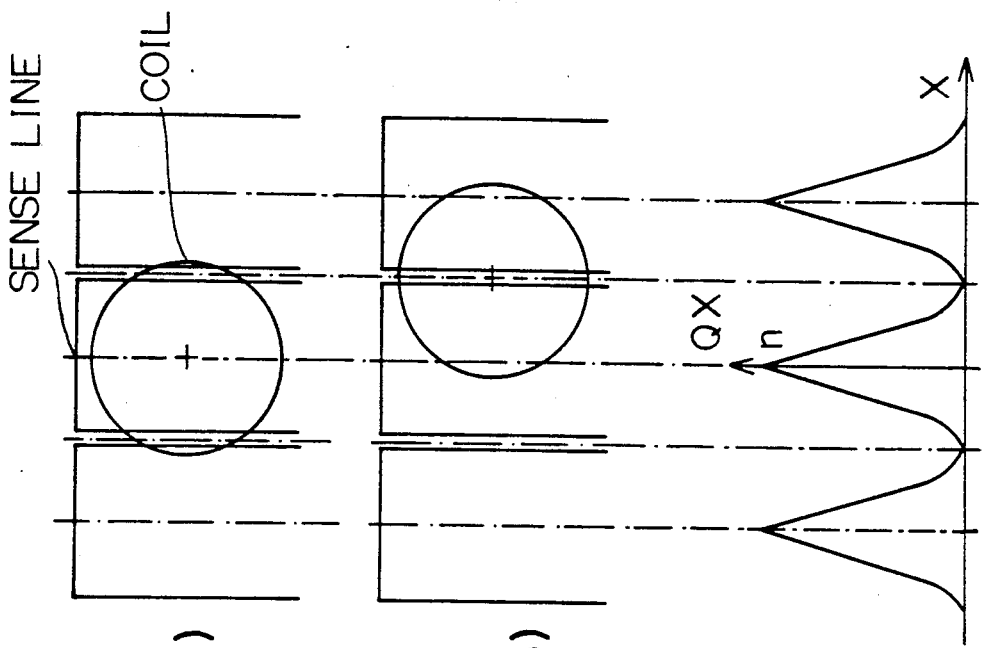
FIG. 6
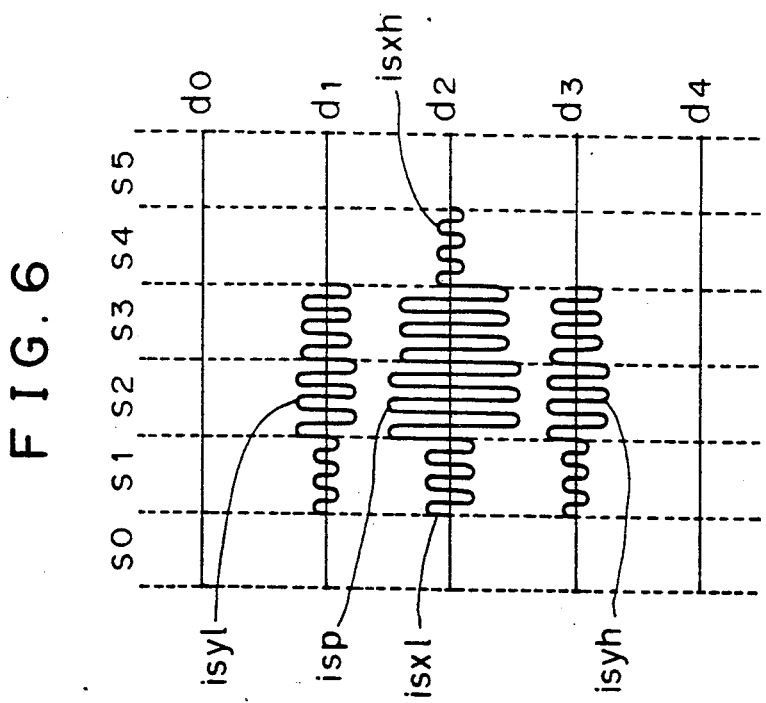
FIG. 7(a)
FIG. 7(b)

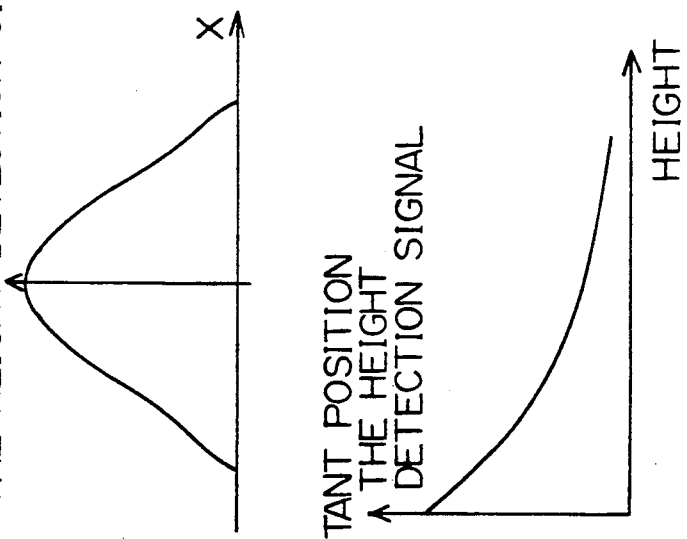
FIG. 9
THE CONVERSION TABLE OF
THE HEIGHT DETECTION SIGNAL
| QX | CORRECTION QUANTITY |
|---|---|
| 0 | 33 |
| 1 | 33 |
| 2 | 33 |
| 20 | 27 |
| 255 | 0 |
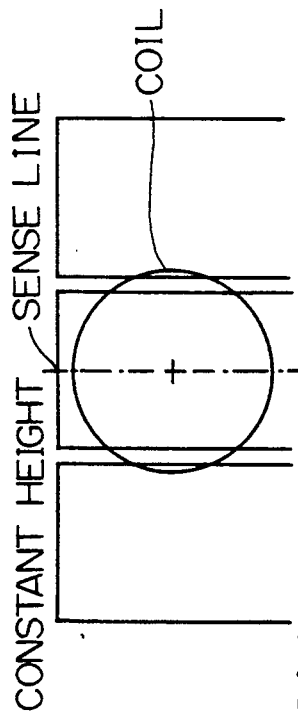
FIG.8(a)
FIG.8(b)

WIRELESS COORDINATE READER AND SWITCH STATE DETECTION SYSTEM FOR COORDINATE INDICATOR

BACKGROUND OF THE INVENTION

This invention relates to a coordinate reader for inputting coordinate values to an external apparatus such as a computer, and more specifically to a wireless coordinate reader in which a coordinate reader main body need not be connected to a coordinate indicator by signal lines.

In a coordinate reader which influences electromagnetic coupling between an excitation line and a sense line through a resonant circuit consisting of a coil and a capacitor and provided as part of a coordinate indicator, the phase of the induction signal induced to the sense line changes with the resonance frequency of the coordinate indicator.

Referring to FIG. 14(b), the resonance frequency of the coordinate indicator can be changed, for example, by connecting a series circuit formed by a switch 107 and a second capacitor 108 in parallel with a basic parallel resonant circuit formed by a coil 105 and a first capacitor 106.

As shown in FIG. 14(a), the coordinate indicator 104, constituted as described above, is associated with a tablet, or plate, 101 which includes excitation lines 102 and sense lines 103 disposed so as to cross one another orthogonally. An A.C. signal is applied as an excitation signal to the excitation lines 102 and the induction signals induced on the sense lines 103 are observed.

The coordinate indicator 104 is placed on or directly above the sense line plate 101 and the switch 107 is turned ON or OFF. When the switch 107 is OFF, the induction signal and the excitation signal have a predetermined phase difference due to the effect resulting from electromagnetic coupling and to the circuit characteristics. When the switch 107 is ON, the second capacitor 108 is connected in parallel with the resonant circuit, so that the resonance frequency changes to a lower frequency value and the phase of the induction signal has a greater delay than at the time switch 107 is OFF. The state of switch 107 can be judged by detecting this phase delay.

In the general structures of coordinate readers, a circuit substrate or the like is disposed often below the sense line plate and a shield plate consisting of a metal plate is disposed in most cases between the sense line plate and the circuit substrate in order to cut off noise.

If the metal plate is disposed below the sense line plate, the inductance of the coil of the coordinate indicator is affected by it. The inductance of the coil changes in accordance with the height at which the coordinate indicator is placed or, in other words, in accordance with the distance between the coordinate indicator and the shield plate. This change of coil inductance affects the phase of the induction signal.

This becomes a problem for a system which judges the state of the switches of the coordinate indicator by the change of phase of the induction signal. Since the phase difference between switches becomes inevitably smaller when a greater number of switches are to be detected, the change of phase due to indicator height cannot be neglected.

SUMMARY OF THE INVENTION

A general object of the present invention is to obviate the problem with the prior art technique described above.

A more specific main object of the present invention is to provide a wireless coordinate reader in which a coordinate reader main body need not be connected to a coordinate indicator by signal lines and which can detects the ON/OFF states of a plurality of switches associated with the coordinate indicator.

The present invention provides a wireless coordinate reader which corrects fluctuations of phase due to the influences of a metal plate disposed below a sense line and which can detect correctly the switch states.

In a wireless coordinate reader in which an A.C. signal is applied sequentially to a plurality of excitation lines laid down on a sense line plate, sense lines are selected sequentially and a coordinates value is determined from the induction signals which are induced in the sense lines by electromagnetic coupling between three members, i.e. an excitation line, a coil and a sense line, when a coordinate indicator having a resonant circuit consisting of a coil and a capacitor is placed on the sense line, the present invention provides a coordinates reader capable of detecting the ON/OFF states of a plurality of switches associated with the coordinate indicator.

To accomplish this object, the present invention connects a switch circuit, which is formed by connecting a plurality of series circuits each consisting of a switch and a resistor in parallel with each other and connecting a capacitor in series with one of the ends of this parallel circuit, in parallel with a resonant circuit consisting of a coil and a capacitor to constitute a coordinate indicator, and constitutes a coordinate reader by an amplification detection circuit for detecting the amplitude of an induction signal induced on a sense line, a phase detection circuit for detecting the phase and a control circuit for determining the states of switches of the coordinate indicator from the detected signal amplitude and phase.

When the switch of the coordinate indicator is manipulated, the resonance frequency of the resonant circuit changes and this change causes a change in the phase of the induction signal. The present invention detects this phase change and thus detects the switch state.

When a metal plate is disposed below the sense line plate, the phase of the induction signal changes also in accordance with the height of the coordinate indicator above the plate. The present invention corrects the amplitude of a specific induction signal by coordinate data, uses it as height data, makes a determination of the switch state after the phase signal is corrected and correctly detects the switch state.

Stated in greater detail, the present invention resolves the problems described above, by the provision of a wireless coordinate reader which comprises a sense line plate having a plurality of excitation line groups and a plurality of sense line groups superposed and arranged on the sense line plate; a coordinate indicator including a resonant circuit composed of a coil and a first capacitor, and a switch circuit connected in parallel with the resonant circuit, the switch circuit being constituted by connecting one or a plurality of series circuits, each consisting of a switch and a resistor, in parallel with one another and by connecting a second capacitor in series with one of the ends of the parallel circuit; an amplification detection circuit for detecting an amplitude signal of the induction signal which is induced on the sense line groups when an A.C. signal having a frequency in proximity of the resonance frequency of the resonant circuit of the coordinate indicator is applied to the excitation line groups and the coordinate indicator is placed on the sense line plate; a phase detection circuit for receiving the A.C. signal applied to the excitation line groups and the induction signal induced in the sense line groups, detecting the phase of the induction signal and outputting it as a phase signal; and a controller for controlling each component of the coordinate reader, receiving the amplitude signal and the phase signal, correcting height data extracted from the amplitude signals by the coordinates data calculated on the basis of the amplitude signal, correcting the phase signal on the basis of the corrected height data, and judging the state of switches of the coordinate indicator from the corrected phase signal.

In a wireless coordinate reader having the construction described above, the controller is provided with processing means for selecting the excitation line groups and the sense line groups, and receiving the amplitude signal from the amplification detection circuit and the phase signal from the phase detection circuit; processing means for calculating the coordinates of the position of the coordinate indicator on the basis of the inputted amplitude signal; processing means for extracting a signal representing the amplitude of an induction signal induced in a sense line having a specific positional relation with the position of the coordinate indicator from the amplitude signal as a height detection signal; processing means for correcting the height detection signal by the coordinates data and calculating height data of the position of the coordinate indicator; processing means for extracting a phase signal representing the phase of an induction signal induced in a sense line having a specific positional relation with the position of the coordinate indicator from the phase signal, as a switch detection phase signal; processing means for correcting the switch detection phase signal by the height data and calculating a switch phase signal; and processing means for judging the state of the switches of the coordinate indicator by the switch phase signal.

In the coordinate reader described above, the induction signal is generated on the sense line if the coordinate indicator is placed in proximity of the selected excitation line and sense line during the process in which A.C. signals as the excitation signals are sequentially applied to the excitation line group and the sense line group is selected.

If the switch of the coordinate indicator is not closed, the phase of the induction signal has a predetermined phase difference from that of the excitation signal. If the switch is closed, the capacitor is connected in parallel with the resonance circuit through the resistor connected in series with the closed switch and the resonance frequency changes to a lower value.

The induction signal induced in the sense line is inputted to the amplification detection circuit which detects the amplitude signal and to the phase detection signal circuit which detects the phase signal. The control circuit first calculates the coordinate data on the basis of the amplitude signal and corrects the height data extracted from the amplitude signal on the basis of the coordinate data. Furthermore, it corrects the phase signal by the corrected height data and determines the switch state by the phase data after correction. In this manner, correct detection of the switch state can be made without being affected by the height.

BRIEF DESCRIPTION OF THE DRAWINGS

FIG. 6 is a signal generation timing chart for an induction signal produced in a reader according to the present invention.

FIGS. 7(a) and 7(b) are distribution diagrams of coordinate data QX produced in a reader, according to the present invention.

FIGS. 8(a) and 8(b) are distribution diagrams of height detection signals produced in a reader according to the present invention.

FIG. 9 is shows a conversion table for height detection signals.

DESCRIPTION OF THE PREFERRED EMBODIMENTS

Hereinafter, a first embodiment of the present invention will be described with reference to FIGS. 1 to 11.

Figure 1:
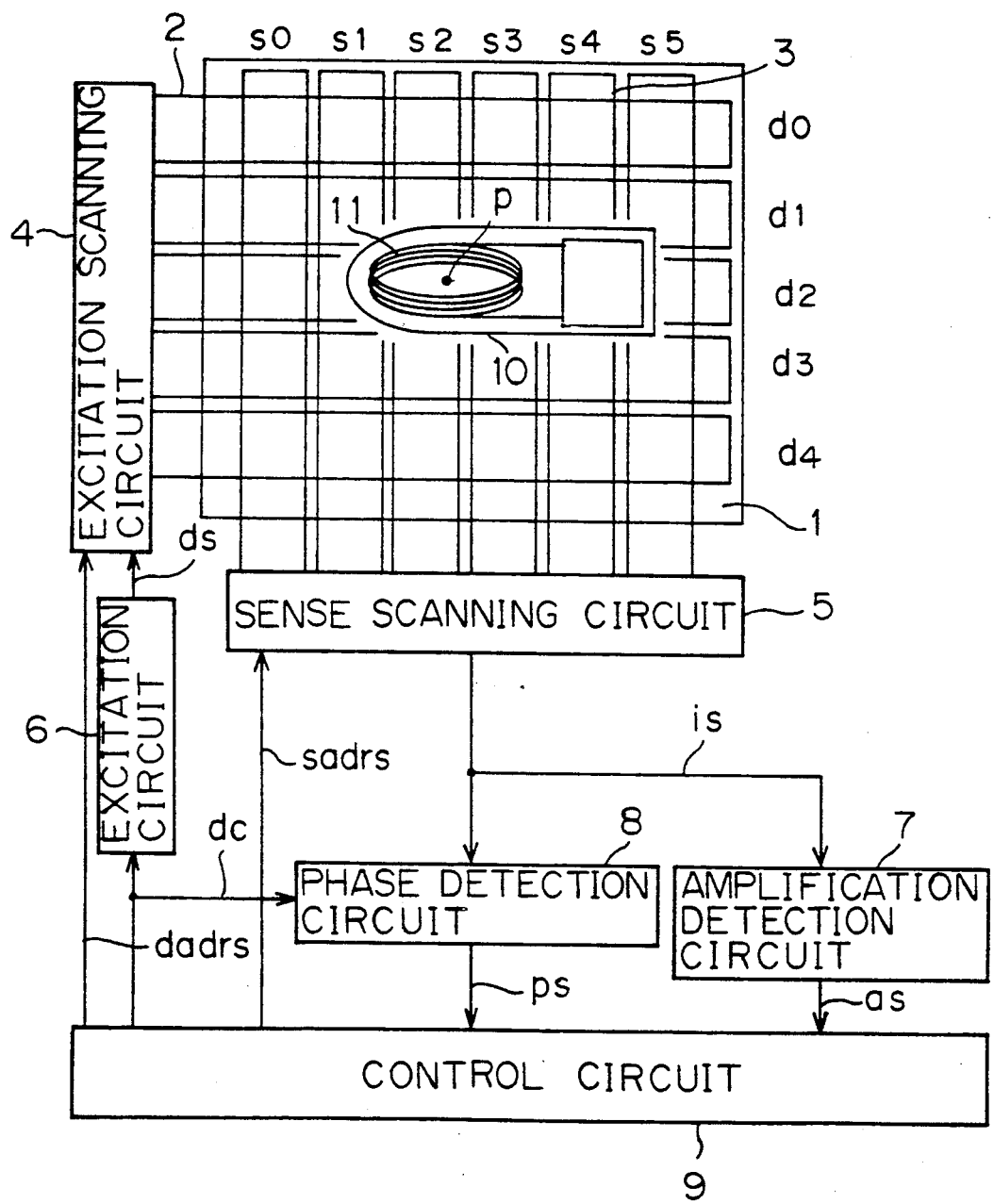
FIG. 1 is a diagram illustrating the configuration of a first embodiment of a wireless coordinates reader in accordance with the present invention.

First of all, the construction will be explained. In FIG. 1, reference numeral 1 represents a sense line plate on which are laid an excitation line group 2 and a sense line group 3. The excitation line group 2 and the sense line group 3 constitute turned-back, or U-shaped, loops and are mutually aligned equidistantly from one another. In the first embodiment, the excitation line group 2 and the sense line group 3 are disposed in such a manner as to cross one another at right angles.

Figure 2:
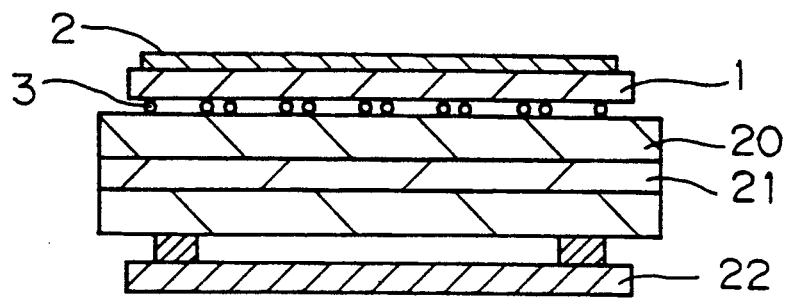
FIG. 2 is a cross-sectional view of a sense line plate employed in the embodiment of FIG. 1.
Figure 3:
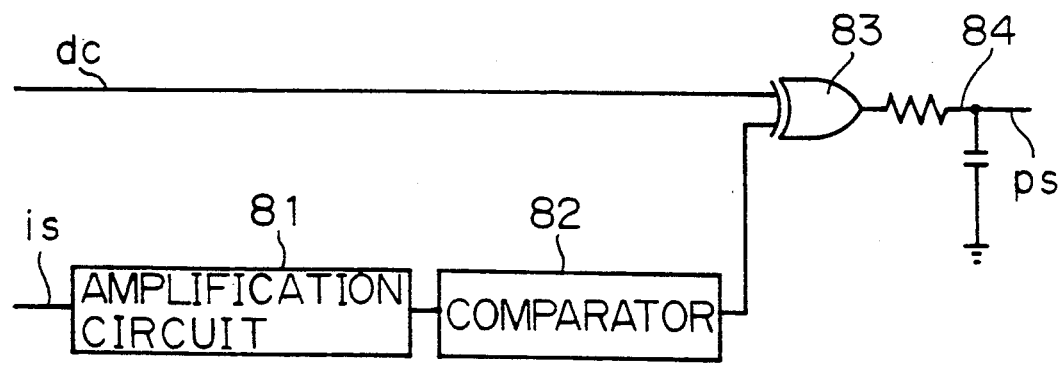
FIG. 3 is a diagram showing a phase detection circuit employed in the embodiment of FIG. 1.

As shown in FIG. 2, but not in FIG. 1, a metal plate 21 is disposed below sense line plate 1 with a spacer 20 sandwiched between them. Plate 21 is a shield plate for eliminating the influences of a circuit substrate 22 which is disposed further therebelow.

Reverting to FIG. 1, each excitation line of excitation line group 2 is connected to an excitation scanning circuit 4. The excitation scanning circuit 4 consists of a plurality of electronic switching devices such as analog switches and is constituted so as to deliver an excitation signal ds supplied from an excitation circuit 6 to the selected one of the excitation lines.

Each sense line of sense line group 3 is connected to a scanning circuit 5 which consists of electronic switching devices in the same way as excitation scanning circuit 4. Circuit 5 selects one of the sense lines and connects it to an amplification detection circuit 7 and a phase detection circuit 8.

Excitation circuit 6 receives an excitation clock dc from a control circuit 9, shapes its waveform and amplifies and outputs it as excitation signal ds.

Amplification detection circuit 7 amplifies and detects an induction signal is induced in the sense line group 3 and outputs an amplitude signal as based on the induction signal.

Phase detection circuit 8 derives a phase signal ps from induction signal is. One embodiment of phase detection circuit 8 is shown in detail in FIG. 3 and includes an amplification circuit 81 and a comparator 82. The induction signal is from sense scanning circuit 5 is inputted to amplification circuit 81. The output of comparator 82 is connected to one of the inputs of an exclusive-OR circuit 83. Excitation clock dc is inputted to the other input of the exclusive-OR circuit 83 and the output of circuit 83 is connected to an integration circuit 84 consisting of a resistor and a capacitor. The circuit of FIG. 3 converts the excitation clock dc to a reference phase signal and detects the phase of the induction signal is as a voltage signal ps stored by integration circuit 84.

The construction of the phase detection circuit 8 shown in this embodiment is a circuit which detects the magnitude of the difference in phase between induction signal is and excitation clock dc, but cannot differentiate between advance and delay. However, freedom in setting of the reference signal for phase detection, circuit characteristics, and the like, can be improved as design items and it is believed that the induction signal exhibits the advance and delay behaviors in comparison with the reference signal depending on design. In such a case, a circuit for differentiating between advance and delay of the phase is not required. This circuit can be implemented easily. The construction of the phase detection circuit is not an essential feature of the present invention. In short, it may be a circuit which detects the phase difference between the two signals and the invention is not limited to this circuit.

Reverting to FIG. 1, control circuit 9 controls each unit, receives and calculates each signal and determines the coordinate values and the state of the switches. It supplies a drive address dadrs, for designating the excitation line which is to be selected, to excitation scanning circuit 4 and a sense address sadrs, for designating the sense line which is to be selected, to sense scanning circuit 5. It receives the amplitude signal as and the phase signal ps for calculating the coordinate values and the switch state. This control circuit 9 is implemented by a microprocessor and each operational process is executed by a program.

Figure 4:
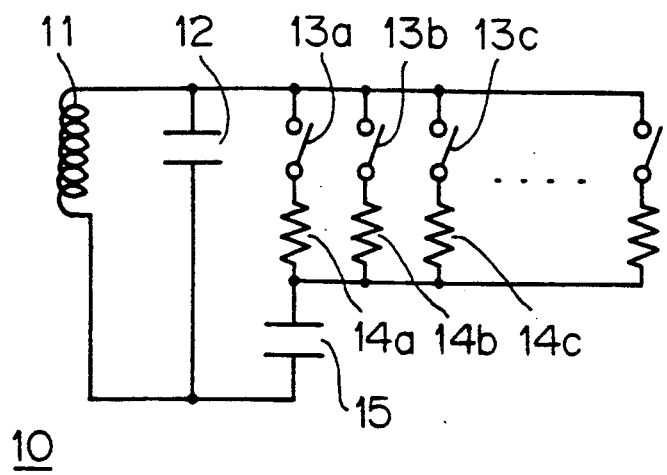
FIG. 4 is a circuit diagram of a coordinate indicator circuit employed in the embodiment of FIG. 1.

The reader of FIG. 1 further includes a coordinate indicator, one embodiment of which is shown in FIG. 4. A coil 11 and a first capacitor 12 together form a parallel resonant circuit. The resonance frequency of this resonant circuit is set to a value near the frequency of the excitation clock dc. It need not always be equal to the excitation clock frequency.

A switch 13a and a resistor 14a are connected in series and constitute one sub-switch circuit. This embodiment uses a normally-open type switch as the switch 13 in order to vary the resonance frequency towards a lower value when the switch 13 is pushed, as will be described later in further detail. A plurality of sub-switch circuits 13b, 14b, etc. are connected in parallel and a second capacitor 15 is connected in series with one of the ends of the parallel circuit to form a switch circuit. This switch circuit is connected in parallel with resonant circuit 11, 12 described above.

The resistors of the sub-switch circuits have respectively different values so that the change in phase becomes different when each switch is pushed. However, the same value may be used naturally when the same meaning is provided to the plurality of switches.

The state where a plurality of switches are pushed simultaneously can be detected, too, by employing suitable constants.

Next, the operation of the above described arrangement will be described. It is the control circuit 9 that controls the coordinates reader and the control circuit 9 executes the processing shown in the flowchart of FIG. 5. To begin with, the operation of selecting the excitation line group 2 and the sense line group 3 and the coordinates data calculation operation will be described.

The control circuit 9 outputs the drive address dadrs and selects one of the excitation lines (step 1). Accordingly, the output of the excitation circuit 6 is connected to the selected excitation line and this excitation line generates an A.C. electromagnetic field. While the control circuit 9 selects one excitation line, it outputs the sense address sadrs and selects sequentially the sense lines of group 3 (step 2). The selected sense line is connected to the amplification detection circuit 7 and to the phase detection circuit 8.

Figure 5:
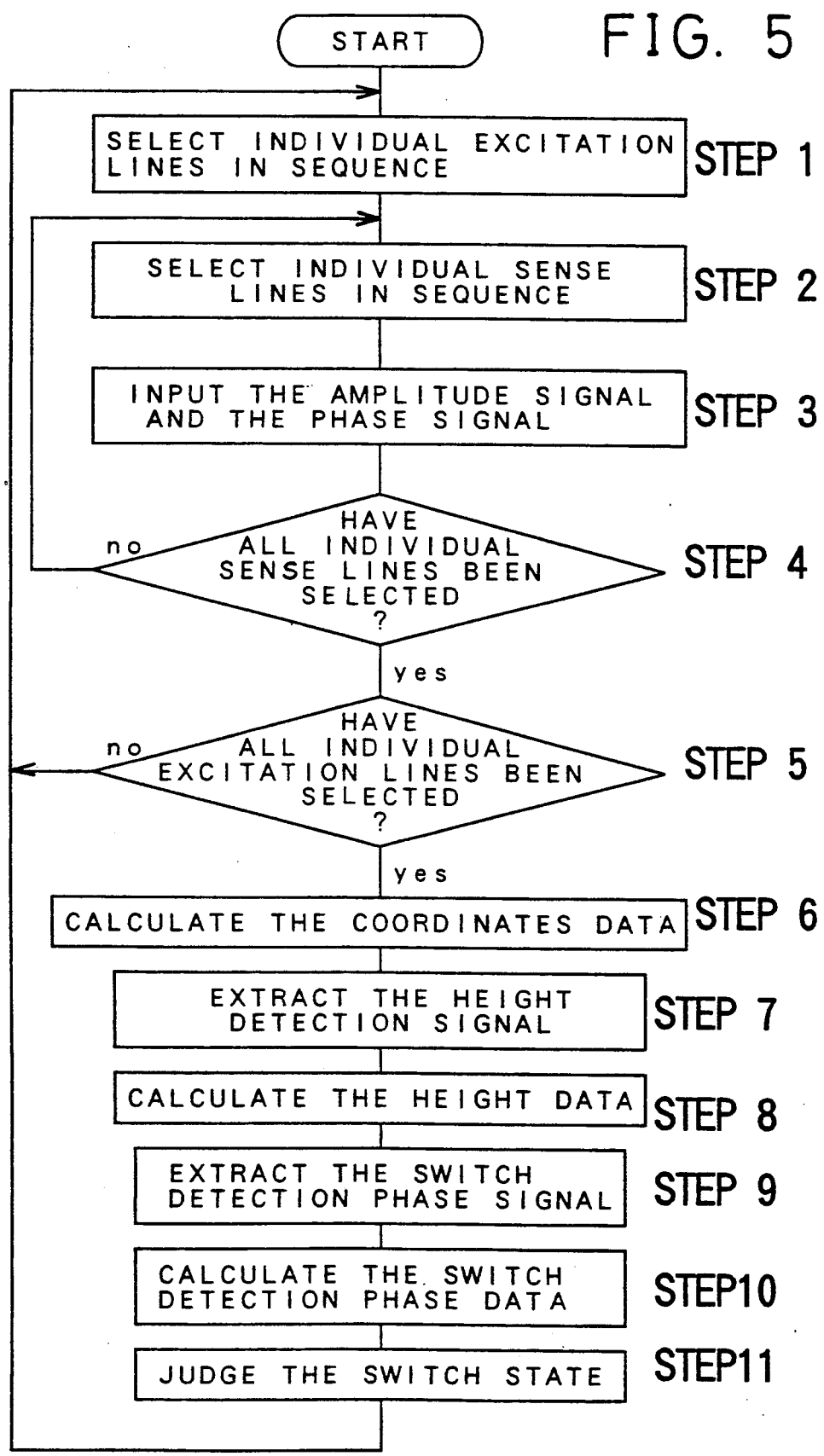
FIG. 5 is a flowchart illustrating the processing of data in a control circuit employed in the embodiment of FIG. 1.

In the flowchart shown in FIG. 5, the sense lines of group 3 are selected sequentially after the excitation line of group 2 is decided but this sequence may be reversed. In the latter case, the sequence of step 4 and step 5 in FIG. 5 is reversed, as well.

When the coordinates indicator 10 is not operatively associated with the sense line plate 1, no signal is induced in the selected excitation line because the excitation line group 2 and the sense line group 3 have an orthogonally crossing relation. When the coordinates indicator 10 is placed on the sense line plate 1, however, the induction signal is induced in each sense line of the sense line group 3 in accordance with the positional relation between the sense line plate 1 and the coordinates indicator 10. This is due to the effect of electromagnetic coupling between the three parties, that is, the excitation line, the coil 11 and the sense line.

FIG. 6 shows the induction signal is on a scanning timing chart. It shows the case where the excitation line group 2 is scanned from the upper portion to lower portion of the drawing and the sense line group 3 is scanned from the left to right of the drawing, taking FIG. 1 as an example. In FIG. 1, the position p of the coil 11 exists in the region where the excitation line d2 and the sense line s2 cross each other.

Upon selection of excitation line d0 and sense line s0, whose region of intersection is located a substantial distance from the position p of coil 11, an induction signal is not observed. As the region of intersection of the selected excitation line and sense line comes closer to the position p of the coil, the induction signal is increases in magnitude and achieves a maximum value when the excitation line d2 and the sense line s2 are selected. The induction signal is exhibits a distribution such as shown in the timing chart of FIG. 6.

The induction signal is converted to the amplitude signal as by amplification detection circuit 7 and to the phase signal ps by phase detection circuit 8. The magnitudes of the amplitude and phase signals are read by control circuit 9 (step 3 of FIG. 5). The input stage of control circuit 9 is an A/D conversion circuit and reads these signals as digital quantities.

Control circuit 9 repeats the processing described above for the range in which the induction signals necessary for calculating the coordinate data are obtained, such as a region occupied by five excitation lines and five sense lines (steps 4 and 5 of FIG. 5). This operation is called "scanning". Additionally the scanning range is not limited to five lines of each group.

When one scanning operation is completed, calculation of the coordinate data (step 6 of FIG. 5) is conducted by the following method. The control circuit 9 detects the amplitude signals of the signals isp, isxl, isxh, isvl, isvh shown in the timing chart of FIG. 6 from among the amplitude signals as that are read and calculates the coordinates data of the position at which the coordinates indicator 10 is placed in accordance with following equation set (1):

$$QX = \frac{(isp - isxl) \cdot n}{(isp - isxh)}$$

when $isxl > isxh$, and $$QX = \frac{(isp - isxh) \cdot n}{(isp - isxl)}$$

when $isxh > isxl$,
where n is a constant.

Though the equation set (1) represents one axis of the X-Y coordinates system, it can likewise be applied to the other axis. The following explanation will be given also with reference to only one axis.

The characteristics of the value QX of equation set (1) will be explained with reference to FIGS. 7. First of all, when the coil 11 is placed at the center of a certain sense line (FIG. 7(a)), the induction signals isxl and isxh on both adjacent sides of isp are equal to each other; hence, QX=n from equation set (1). When coil 11 moves and reaches the position between the sense line which induces isp and the sense line which induces isxh (FIG. 7(b)), ips and isxh are equal to each other; hence, QX=0 from equation set (1). Namely, QX takes the value between n and 0 while the center of coil 11 moves from the center of a certain sense line to the boundary with the adjacent sense line.

This relation exhibits the opposite tendency on the right and left sides with the center of the sense line being the boundary and the same tendency is exhibited for each sense line. In other words, the relation identifies the current position of coil 11 between two sense lines. This information is hereby called "coordinate data".

Incidentally, the coarse position coordinates of coil 11 on sense line plate 1 as a whole can be determined from the sense line number and from the coordinate data obtained hereby, though this can be done in accordance with the prior art and is not the gist of the present invention, and it is used as the coordinates value.

Next, the operation for calculating height data will be described.

First of all, the terms to be used will be explained briefly in order to clarify the following explanation. In the following explanation, the term "height detection signal" means the signal before correction by coordinate data is made and the term "height data" means the signal after correction by coordinate data is made.

To begin with, the control circuit 9 extracts the amplitude data of the induction signal isp used for calculating the coordinate data from the amplitude signals as of the induction signals inputted during the scanning operation and uses it as the height detection signal. (step 7 of FIG. 5))

The induction signal isp in this case can be defined as the induction signal of the sense line which is closest to coordinate indicator 10. This signal is an example of an "induction signal induced in the sense line having a specific positional relation with the position at which the coordinates indicator is placed" and is not particularly limited to isp. For example, isxl, too, has a specific relation with the coordinate indicator and the sense line inducing this signal and this is the signal whose magnitude changes according to the position at which the coordinate indicator is placed and to the height. Similarly, this signal can be used as the height detection signal.

When the amplitude signal of the induction signal isp is employed as the height detection signal, the magnitude of the height detection signal becomes a function of the position and height of the coil inside the sense line as shown in FIGS. 8. FIG. 8(a) shows the relation between the coil position and the height detection signal when height is kept constant. As shown in the drawing, the magnitude of the height detection signal exhibits the tendency such that it becomes maximum when the center of coil 11 is aligned with the center of a sense line, and drops gradually as the coil moves to the peripheral portions of the sense line. FIG. 8(b) shows the relation between the coil height and the height detection signal when the position is kept constant and the height above plate 1 is varied. It is obvious without any explanation that the height detection signal drops as the coil moves higher. Thus, the height detection signal cannot be used without any modification to designate the height.

On the other hand, the coordinate data have the relation shown in FIGS. 7. Since the coordinate data and the height detection signal have a predetermined relation with respect to the position of coil 11 relative to the center of a sense line, it is possible to eliminate the influences of the position on the height detection signal by correcting the height detection signal by the coordinate data. This is a very important processing step in the practice of the present invention.

More specifically, as coil 11 moves toward the peripheral portions of the sense line, both the coordinate data QX and the height detection signal tend to decrease. Therefore, processing is performed so that the decrement of the coordinate data QX is corrected and added to the height detection signal. Conversely, the increment of the coordinate data at the center of the sense line is corrected and subtracted from the height detection signal to give the same result.

The relation between the coordinate data and the correction quantity of the height detection signal is complicated. Therefore, a conversion table from the coordinate data to the correction quantity is employed to perform the processing. FIG. 9 is an explanatory diagram of the conversion table for the height detection signal. First of all, the relation between the coordinate data and the correction quantity is examined by experiments and the result is stored in the form of the conversion table. This conversion table is retrieved by the coordinate data calculated in step 6 of FIG. 5 in order to obtain the correction quantity. This correction quantity is, depending on the relationship established, added to or subtracted from the height detection signal and the result is used as the height data. (step 8 of FIG. 5)

FIG. 9 shows an example of the conversion table when n=255 in equation set (1) for calculating the coordinate data QX. In this table, the decremented quantity of the height detection signal in proportion to the movement distance of the coil 11 from the center of the sense line toward its peripheral portions is registered as the correction quantity. It will be assumed, for example, that the coil 11 moves toward the far peripheral portion of the sense line and QX=20 is obtained as the coordinate data. By use of this conversion table, the correction quantity corresponding to QX=20 is 27 and this value is added to the height detection signal.

Next, the operation for judging the switch state will be described.

Here, the terms will be explained once again briefly. In the following explanation the term "switch detection phase signal" means a signal before correction for height is effected and the term "switch phase data" means a signal after correction for height is effected.

The control circuit 9 performs scanning of sense line plate 1 as described already. During the scanning, the induction signal is inputted to the phase detection circuit 8 and is converted to the phase signal ps.

Figure 10:
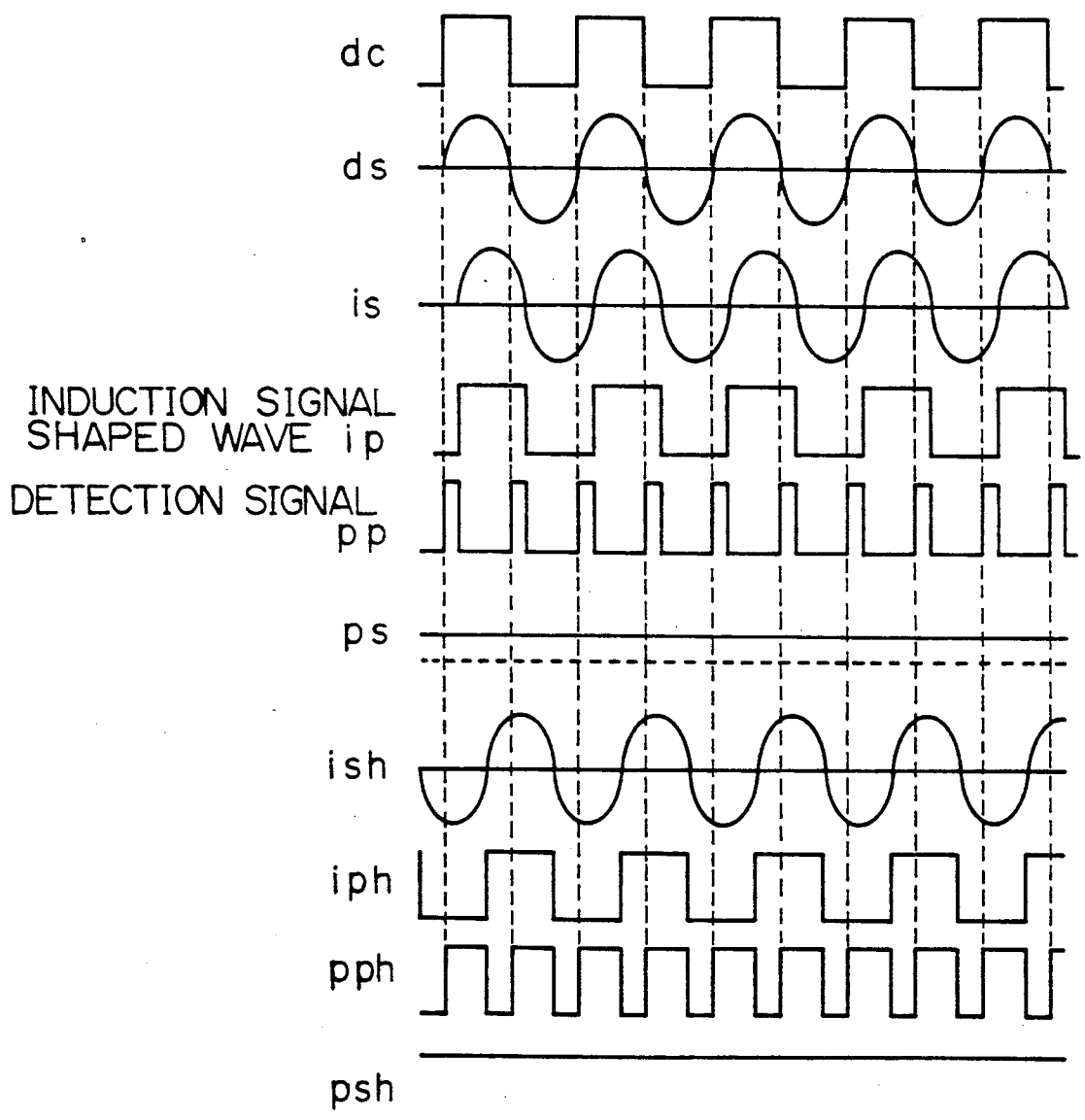
FIG. 10 is a timing chart illustrating a phase detection operation.

The operation of the phase detection circuit 8 will be explained with reference to the timing chart of FIG. 10. In the drawing, dc is the excitation clock, ds is the excitation signal and is the induction signal. When no switch of the coordinates indicator 10 is pushed, the induction signal is induced while having a predetermined phase difference with respect to the excitation signal ds.

The process in which the induction signal is processed will be explained. First, the induction signal is amplified by the amplification circuit 81 inside the phase detection circuit 8 and is converted to a square wave by the comparator 82. It becomes thus an induction signal shaped wave ip. The induction signal shaped wave ip and the excitation clock dc are phase-detected by the exclusive-OR circuit 83 to provide a detection signal pp. The detection signal pp is converted to a D.C. signal by the integration circuit 84 to provide a phase signal ps.

when one of the switches, e.g. 13a, of the embodiment of coordinate indicator 10 shown in FIG. 4 is pushed, second capacitor 15 is connected in parallel with the resonance circuit through the resistor, e.g. 14a, which is connected in series with the pushed switch. Therefore, the resonance frequency of the resonant circuit changes to a lower frequency value. This change works in the direction of delaying the phase of the induction signal is. In FIG. 10, the induction signal ish is a signal produced when one of the switches is pushed and represents a phase that is delayed from the phase of the induction signal is when no switch is pushed. This signal is phase detected to by circuit 83 to provide detection signal pph which is converted by circuit 84 to the phase signal psh. As is obvious from the operation of the circuit, the magnitude of the phase signal psh is greater than that of the phase signal ps and it can be thus understood that the phase change can be detected.

During the scanning processing, the control circuit 9 performs A/D conversion of the phase signal ps and acquires its magnitude. Then, the control circuit 9 adopts the phase signal ps generated when the signal isp, which is used for calculating the coordinates, is generated as shown in FIG. 6, as the switch detection phase signal as the fundamental data for judging the switch state (step 9 of FIG. 5).

The timing at which the switch detection phase signal ps is employed is not limited to the case described above where the signal isp occurs. Since phase detection is possible so long as the induction signal is generated, sampling may be made at a specific timing. In view of S/N considerations, however, it is preferred to detect the phase of isp which is the greatest induction signal.

Figure 11:
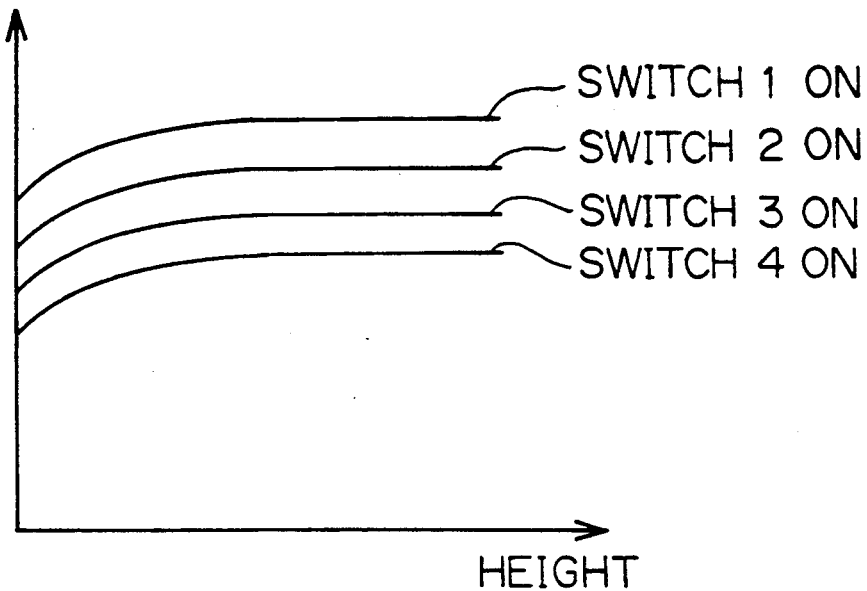
FIG. 11 is a diagram illustrating switch detection phase signals.

As described earlier herein, however, the switch detection phase signal extracted in the manner described above is a signal which is affected by the height of the coil. More specifically, as the height of the coil becomes greater, inductance of the coil increases and the resonance frequency of the resonant circuit changes to a lower frequency value, so that the phase tends to delay more. This tendency is schematically shown in FIG. 11. The drawing shows schematically the change in phase when the height is changed while several switches are kept pushed.

Since the coil height data are obtained already in step 8 of FIG. 5, the switch detection phase signal is corrected in accordance with the data so that this signal is not affected by the height. This is a very important processing step in this case.

The relation between the height data and the correction quantity of the switch detection phase signal is complicated in the same way as the height data conversion processing and for this reason, a conversion table is employed to accomplish the relation in the same way as before. Though details of this are not given here, the correction quantity of the phase change due to the height is obtained from the conversion table for the height data and is added to, or subtracted from, the switch detection phase signal and the result is used as the switch phase data (step 10 of FIG. 5).

The switch position obtained by the processing steps described above is the data in which the change of the phase due to the height is corrected and which reflects only the switch state of the coordinate indicator. The magnitude of the switch phase data is changed when a switch of the coordinate indicator 10 is pushed. The control circuit 9 judges the switch state by comparing this data with the comparison value for phase judgement (step 11 of FIG. 5).

Figure 12:
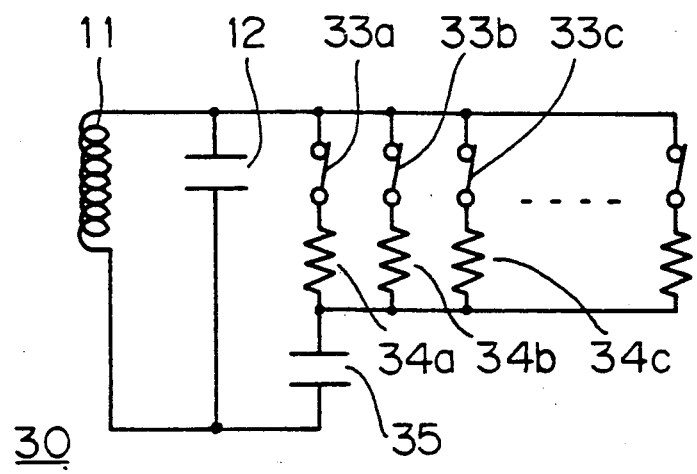
FIG. 12 is a circuit diagram of a second embodiment of a coordinate indicator circuit employed in the embodiment of FIG. 1.

The coordinate indicator in the first embodiment uses normally-open switches but the indicator can contain normally-closed switches, as well. FIG. 12 shows the circuit diagram of the coordinate indicator according to this second embodiment. Construction of the coordinate reader are the same as that of the first embodiment but part of the operation is different.

The switches 33a, 33b, 33c . . . of the coordinate indicator 30 are all normally-closed switches. When none of them are pushed, each switch is closed and the second capacitor 35 is connected in parallel with the resonant circuit 11, 12 through all the resistors 34a, 34b, 34c . . . connected in series with the switches. This means that the second capacitor 35 is connected with a resistance of the lowest attainable value.

Under this state the induction signal is induced with a predetermined phase difference with respect to the excitation signal ds.

When one of the switches is pushed, the resistor connected in series with this pushed switch is cut off from the resonant circuit and the resistance value of the switch circuit changes in an increasing direction. Therefore, the resonance frequency of the resonant circuit changes to a higher frequency value. This change affects the direction in which the phase of the induction signal is advanced.

This advancing change of the phase is detected by the phase detection circuit 8 and the control circuit makes a judgement of the switches in the same way as in the operation explained in the first embodiment.

The gist of the present invention resides in that the frequency of the resonant circuit of the coordinate indicator is changed by manipulating the switches and the change of the phase of the induction signal that occurs due to electromagnetic coupling between the three members, that is, the excitation line, the coil and the sense line is detected so as to judge the switch state of the coordinate indicator. Accordingly, the arrangement of the excitation lines and sense lines and the scanning method are not limited to those of the first embodiment.

Figure 13:
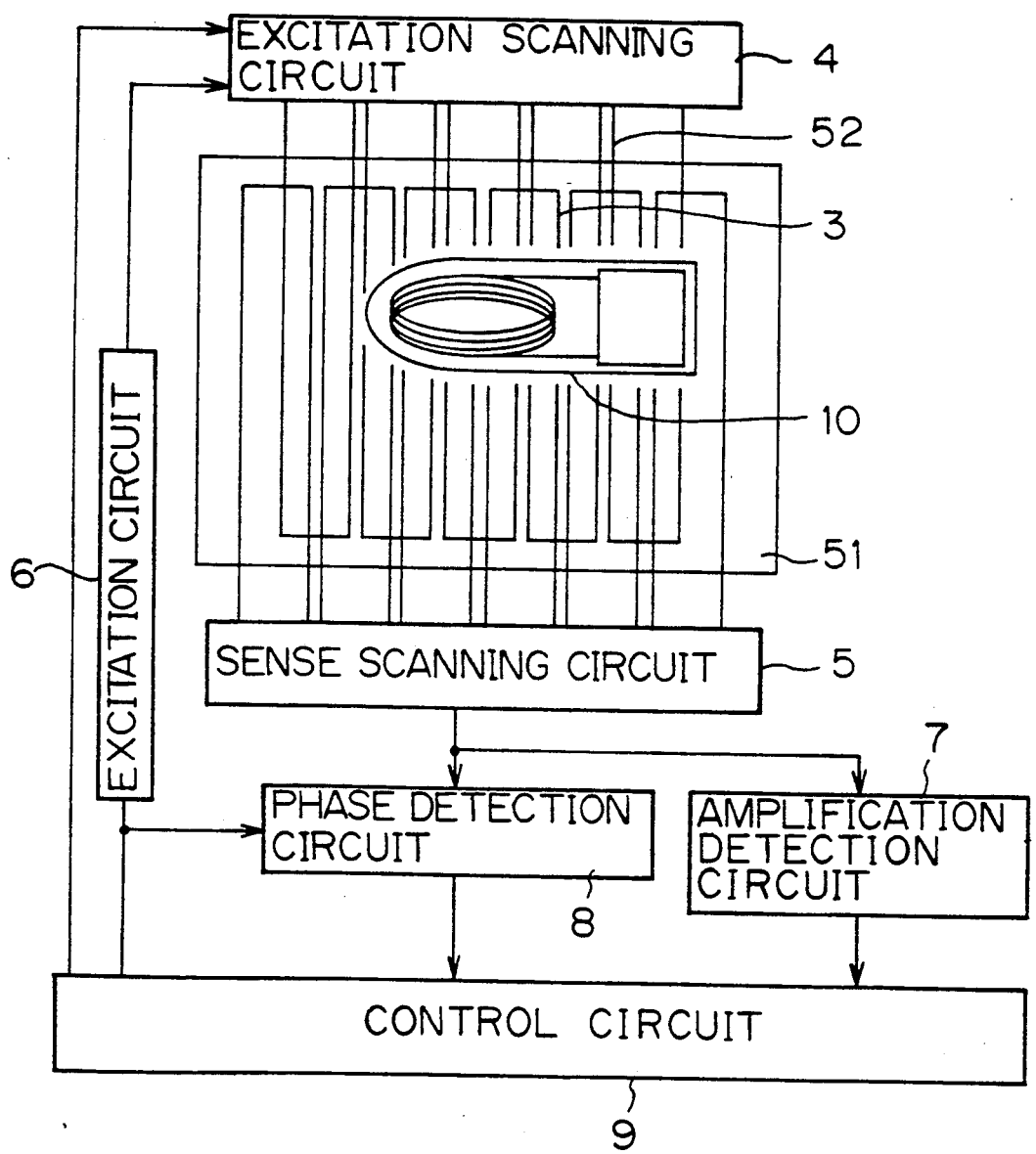
FIG. 13 is a diagram illustrating the configuration of a further embodiment of a wireless coordinates reader in accordance with the present invention.
Figure 14A:
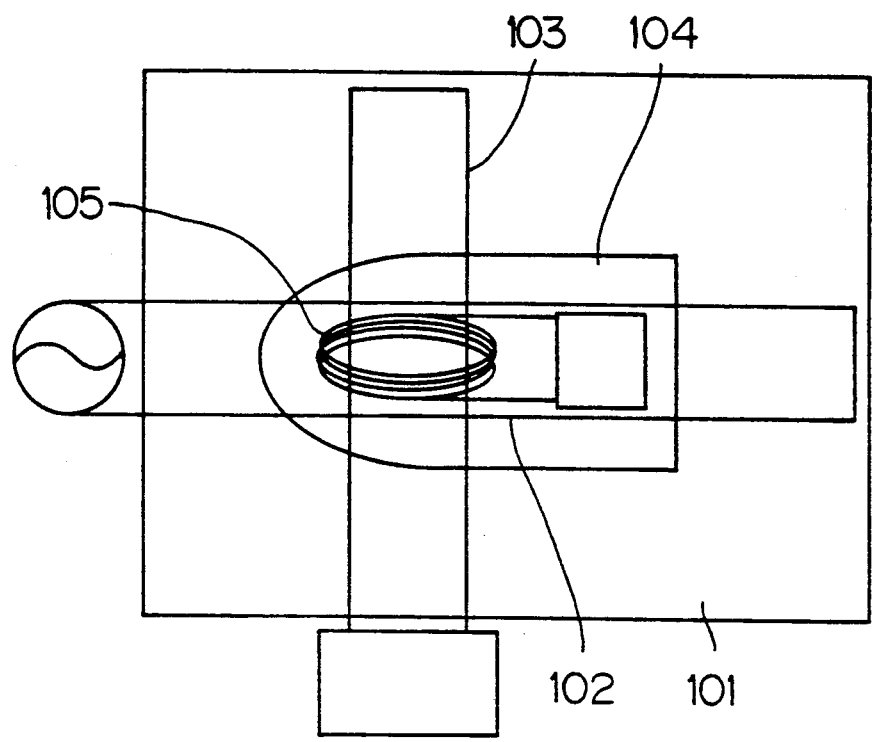
FIGS. 14(a) and 14(b) are explanatory diagram of a conventional switchable coordinate indicator circuit which has already been described.
Figure 14B:
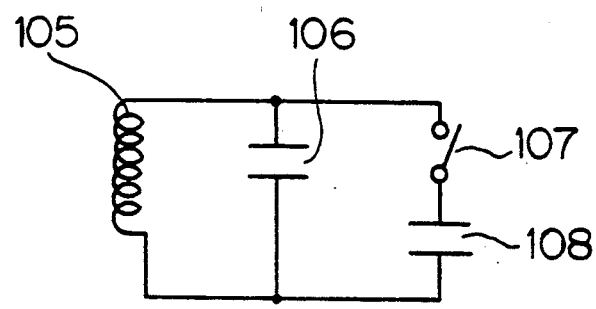

FIG. 13 shows a third embodiment. As shown in FIG. 13, the excitation line group 52 does not cross orthogonally the sense line group 3 but extends in the same direction. Furthermore, both groups overlap partially with one another. The rest of the configuration is the same as that of the first embodiment.

When one excitation line is selected by the excitation circuit 4 and the excitation signal is applied thereto and, at the same time, when one sense line overlapping this selected excitation line is selected on the sense line plate 51 having such a configuration, the induction signal develops on this sense line due to electromagnetic coupling with the excitation line.

The difference between this embodiment and the first embodiment is that an induction signal is generated even though the coordinate indicator 10 is not present on or near sense line plate 51. When coordinate indicator 10 is placed on sense line plate 51, however, coupling becomes stronger and a larger induction signal is generated. Accordingly, the coordinate value can be determined by observing the amplitude of the induction signal and the phase signal can be detected, too.

The induction signal is the sum of the signal which couples through the coil and the signal which couples directly with the excitation line. Therefore, the reference value of the phase signal becomes different from that of the first embodiment. However, whereas the phase of the signal which couples directly with the excitation line is constant, the phase of the signal which couples through the coil changes with the switch state as before, and the switch state can be judged accordingly from the phase signal in the same way as in the first embodiment.

In accordance with the present invention as described above, the coordinate indicator is constituted so that the capacitor is connected in parallel with the resonant circuit through the resistors when any switch is closed and the phase of the induction signal due to electromagnetic coupling between the excitation line group, the coordinate indicator and the sense line group is changed by manipulating the switches. This phase change is detected by the phase detection circuit so that the switch state can be judged by the control circuit. Accordingly, it becomes possible to provide a wireless coordinate reader capable of detecting the state of a plurality of switches disposed on the coordinate indicator without physically connecting the coordinate indicator and the coordinate reader by signal lines.

The present invention corrects the change of the phase signal made due to the height of the coordinate indicator above the sense line plate by means of height data which are based on the original amplitude signal. Therefore, the present invention can provide a wireless coordinate reader capable of detecting accurately the state of a plurality of switches without being affected by the indicator height.

This application relates to subject matter disclosed in Japanese Application 2-153330, filed on Jun. 12, 1990, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A wireless coordinate reader comprising:
   (a) a sense line plate having a plurality of excitation lines and a plurality of sense lines arranged thereon;
   (b) excitation signal delivery means for delivering an alternating excitation signal to a selected excitation line;
   (c) a coordinate indicator including a resonant circuit having a resonance frequency value selected to cause said resonant circuit to induce a signal in at least one sense line in response to an excitation signal in an excitation line and composed of a coil and a first capacitor, and a switch circuit connected in parallel with said resonant circuit, said switch circuit comprising at least one series circuit composed of a switch and a resistor, and a second capacitor connected in series with one end of said series circuit;
   (d) an amplification detection circuit for detecting the magnitude of an induction signal which is induced on a selected sense line when the excitation signal is applied to a selected excitation line and said coordinate indicator is placed above said sense line plate at a location at least approximately above the selected lines and for outputting an amplitude signal representative of the magnitude of the induction signal;
   (e) a phase detection circuit for receiving a signal derived from the excitation signal and the induction signal induced on the selected sense line for outputting a phase signal representing the phase of said induction signal relative to the phase of said excitation signal; and
   (f) a controller connected for receiving said amplitude signal and said phase signal, correcting height data extracted from said amplitude signal by coordinate data calculated on the basis of said amplitude signal, correcting said phase signal on the basis of the corrected height data, and determining the state of said switch from the corrected phase signal.

2. A reader as defined in claim 1 wherein said switch circuit comprises a plurality of series circuits each composed of a switch and a resistor, with all of said series circuits being connected in parallel.

3. Method of determining the state of switches of a coordinates indicator in a wireless coordinate reader according to claim 2, comprising:

(a) selecting an excitation line and a sense line and receiving said amplitude signal from said amplification detection circuit and said phase signal from said phase detection circuit;

(b) calculating coordinate data of the position of said coordinate indicator on the basis of the received amplitude signal;

(c) extracting an amplitude signal associated with an induction signal induced on a sense line having a specific positional relation with the position of said coordinate indicator from said amplitude signal, as a height detection signal;

(d) correcting said height detection signal by the coordinate data and calculating height data representing the height of said coordinates indicator above said sense line plate;

(e) extracting a phase signal associated with an induction signal induced in a sense line having a specific positional relation with the position of said coordinate indicator from said phase signal, as a switch detection phase signal;

(f) correcting said switch detection phase signal by said height data and calculating a switch phase signal; and (g) determining the state of said switches of said coordinate indicator on the basis of said switch phase signal.

* * * * *